(12) United States Patent
Gold et al.

(10) Patent No.: US 10,990,628 B2
(45) Date of Patent: Apr. 27, 2021

(54) SYSTEMS AND METHODS FOR PERFORMING A RANGE QUERY ON A SKIPLIST DATA STRUCTURE

(71) Applicant: HUAWEI TECHNOLOGIES CO., LTD., Guangdong (CN)

(72) Inventors: Israel Gold, Munich (DE); Hillel Avni, Munich (DE)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 230 days.

(21) Appl. No.: 16/294,681

(22) Filed: Mar. 6, 2019

(65) Prior Publication Data

US 2019/0205344 A1 Jul. 4, 2019

Related U.S. Application Data

(63) Continuation of application No. PCT/EP2016/071176, filed on Sep. 8, 2016.

(51) Int. Cl.
*G06F 16/00* (2019.01)
*G06F 16/903* (2019.01)
(Continued)

(52) U.S. Cl.
CPC ...... *G06F 16/90348* (2019.01); *G06F 9/3885* (2013.01); *G06F 16/1767* (2019.01);
(Continued)

(58) Field of Classification Search
CPC ...................................................... G06F 16/24
See application file for complete search history.

(56) References Cited

U.S. PATENT DOCUMENTS

2009/0132563 A1* 5/2009 Herlihy .............. G06F 16/9024
2010/0325132 A1 12/2010 Liu et al.
(Continued)

FOREIGN PATENT DOCUMENTS

| CN | 101030221 A | 9/2007 |
|---|---|---|
| CN | 103823688 A | 5/2014 |
| CN | 103942289 A | 7/2014 |

OTHER PUBLICATIONS

Erez Petrank et al. Lock-Free Data-Structure Iterators, DISC 2013, LNCS 8205, pp. 224-238, 2013.
(Continued)

*Primary Examiner* — Ajith Jacob
(74) *Attorney, Agent, or Firm* — Womble Bond Dickinson (US) LLP

(57) ABSTRACT

In one embodiment, a system for managing a skiplist includes processors arranged for parallel execution of threads, a shared memory storing a skiplist arranged as an ordered set of nodes, and at least one transaction execution thread executed by at least one of the plurality of processors. The at least one transaction execution thread is to execute a range-query operation to identify at least one node of the ordered set of nodes between a first lower key value and a second upper key value, the key-range operation executed by an execution phase and a commit phase, wherein during the execution phase the at least one transaction execution thread traverses nodes of the skiplist in a lock-free state, wherein during the commit phase the at least one transaction execution thread executes a commit protocol that guarantees transaction consistency of the skiplist structure and validates consistency of the range-query operation.

20 Claims, 8 Drawing Sheets

(51) Int. Cl.
  *G06F 16/22* (2019.01)
  *G06F 16/2455* (2019.01)
  *G06F 16/24* (2019.01)
  *G06F 16/176* (2019.01)
  *G06F 9/38* (2018.01)

(52) U.S. Cl.
  CPC ...... *G06F 16/2264* (2019.01); *G06F 16/2272* (2019.01); *G06F 16/24* (2019.01); *G06F 16/24553* (2019.01)

(56) References Cited

U.S. PATENT DOCUMENTS

2016/0117363 A1* 4/2016 Aguilera ................. G06F 16/27
                                                          707/759
2016/0171056 A1  6/2016 Steinemann et al.

OTHER PUBLICATIONS

Deli Zhang et al. A Lock-Free Priority Queue Design Based on Multi-Dimensional Linked Lists, IEEE Transactions on Parallel and Distributed Systems, vol. 27, No. 3, Mar. 2016. pp. 613-626.

Chen Qingquan et al. Application of Data Retrieval System Based on Improvement of Skip List,Computer System Applications, Issue 12, 2008, total 4 pages. With English abstract.

H. Sunde et al. Fast and lock-free concurrent priority queues for multi-thread systems. Journal of Parallel and Distributed Computing. vol. 65, No. 5, May 1, 2005, pp. 609-627, XP004820210.

W. Pugh, Skip lists: A probabilistic alternative to balanced trees, Communications of the AGM. vol. 33 No. 6. Jun. 1990. 9 pages.

Stephen Tu et al. Speedy Transactions in Multicore In-Memory Databases. SOSP'13, Nov. 3-6, 2013, Farmington, Pennsylvania, USA. Total 15 pages.

Yandong Mao et al. Cache Craftiness for Fast Multicore Key-Value Storage, EuroSys'12, Apr. 10-13, 2012, 14 pages.

H.T. King et al. On optimistic methods for concurrency control, ACM Transactions on Database Systems, vol. 6, No. 2, Jun. 1981, pp. 213-226.

Adam Prout, 6. The Story Behind MemSL's Skiplist Indexes. In MemSQL blog, Jan. 20, 2014. 8 pages.

K. Fraser, Practical lock freedom. Cambridge, University Computer Laboratory, Feb. 2004. 116 pages.

T. E. Hart et al. Performance of memory reclamation for lockless synchronization. Journal of Parallel Distributed Computing, 67(12), 2007. pp. 1270-1285.

Steve Heller et al. A Lazy Concurrent List-Based Set Algorithm, Parallel Processing Letters, vol. 17, No. 4 (2007). pp. 411-424.

Tyler Crain et al. No Hot Spot Non-Blocking Skip List, 2013 IEEE 33rd International Conference on Distributed Computing Systems, pp. 196-205.

K.P. Eswaran et al. The Notions of Consistency and Predicate Locks in Database System, Communications of the ACM. vol. 19, No. 11, Nov. 1976. 9 pages.

\* cited by examiner

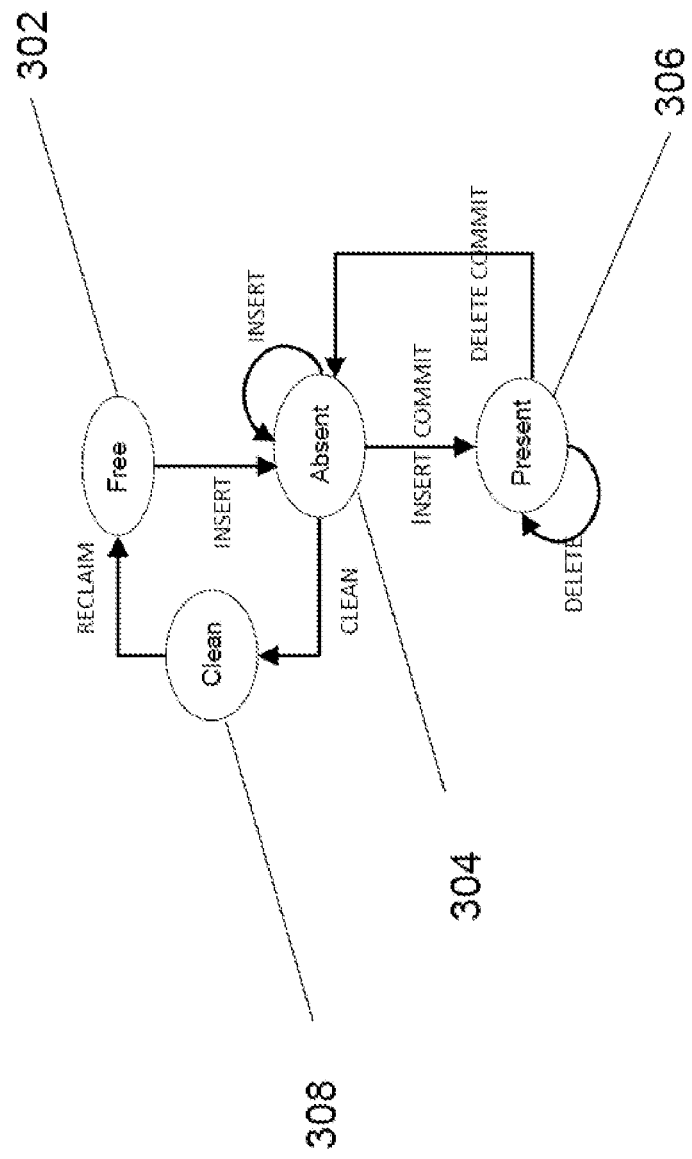

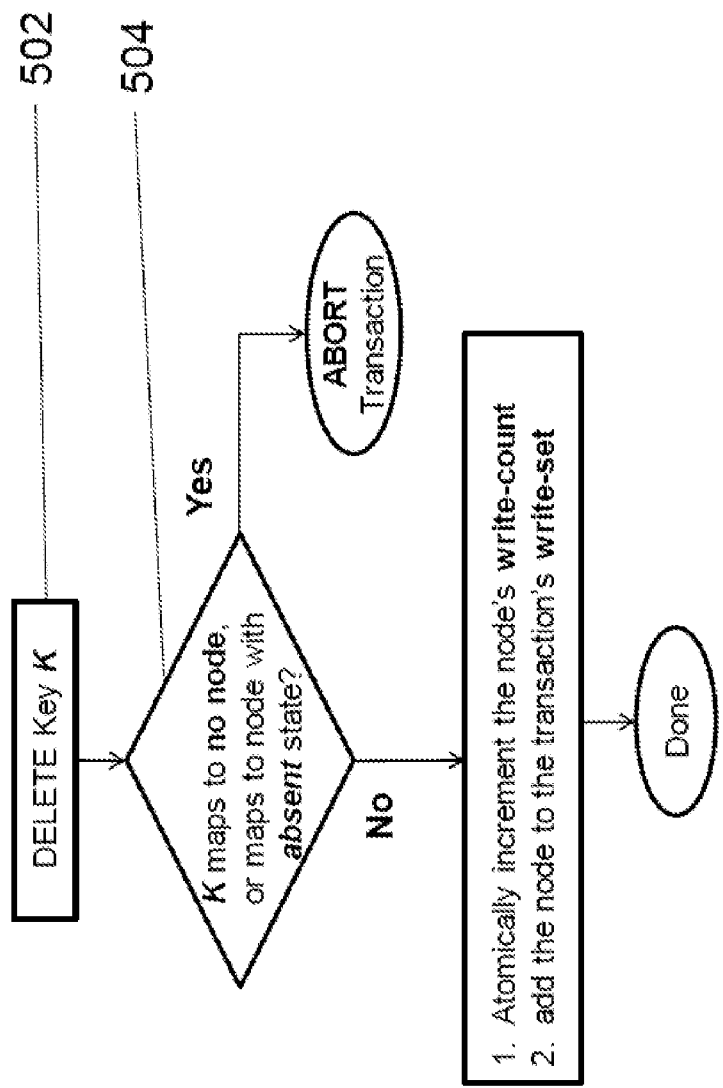

FIG. 6

```
Data: write-set W, scan-set S

// Phase 1: lock write-set
Sort W according to increasing node address;
for each node in sorted(W) do lock(node);

// Phase 2: resolve INSERT/DELETE conflicts and
//          inconsistent RANGE-QUERY
for each node, state in union(W,S) do {
    // Abort if INSERT committed during transaction execution
    if (node.state == present and state == absent) then abort();

// Abort if DELETE committed during transaction execution
    if (node.state == absent and state == present) then abort();
}

// Phase 3: verify RANGE-QUERY consistency
for each node, version, state, range-guard in S do {
    if node.version != version then abort();
    if node.state == clean and node.range-guard == true
        then abort();
}
```

```
// Phase 4: Commit INSERT/ABORT operations
for each node, operation-type in W do {
    if operation-type == INSERT then {
        node, record-id ← inserted record-id value;
        node.state ← present;
        node.connect-level ← node.top-level;
    }
    else { // DELETE
        node.state ← absent;
        node.record-id ← NULL;
    }
} for each node in W do unlock(node);

// Phase 5: Connect inserted nodes
for each node, operation-type in W do {
    if operation-type == INSERT then
        use node.key to connect the node to higher levels
        of the skip list structure
    decrement node.writer-count;
}
```

SYSTEMS AND METHODS FOR PERFORMING A RANGE QUERY ON A SKIPLIST DATA STRUCTURE

CROSS-REFERENCE TO RELATED APPLICATIONS

This application is a continuation of International Application No. PCT/EP2016/071176, filed on Sep. 8, 2016, the disclosure of which is herein incorporated by reference in its entirety.

BACKGROUND

Embodiments of the present invention relate to systems and methods for managing a Skiplist and, more specifically, to systems and methods or performing a range query on a Skiplist data structure.

A Skiplist is an ordered data structure providing expected O (Log(n)) lookup, insertion and deletion complexity. The Skiplist provides a level of efficiency without the need for complex tree balancing or page splitting that are implemented when other ordered data structures are used (e.g., B-trees, Red-Black trees or AVL trees). The Skiplist is a much simpler and more concise data structure to implement.

The Skiplist is made up of elements (also referred to herein as nodes) attached to towers. Each tower in the Skiplist is linked at each level to the next tower at the same height forming a group of linked lists, one for each level of the Skiplist. The towers support binary searching by starting at the highest level and working towards the bottom, using the tower links to check when to move forward in the list or down the tower to a lower level. When a new node is inserted into the Skiplist, the tower height of the new node (also referred to herein as highest level) may be determined randomly (e.g. a tower with height n occurs once in 2^n times). The new node is linked at each level of the Skiplist.

Skiplists may be used in association with databases stored in fast access memory (e.g., main-memory). Skiplists may be used, for example as simple, scalable, and computational efficient index structures mapping to the database. For example, Skiplists may be used to quickly search the database.

A key-range query is a common read operation in database system which retrieves all records with a key value between a given lower and upper boundary. Skiplist nodes (e.g., unlike Masstree nodes (B-Tree Variant)) do not possess a key range. Each Skiplist node only represents a single key. Therefore, performing consistent range queries on the Skiplist is problematic, especially in a multicore environment.

SUMMARY

It is an object of the present invention to provide an apparatus, a system, a computer program product, and a method for managing an ordered list.

The foregoing and other objects are achieved by the features of the independent claims. Further implementation forms are apparent from the dependent claims, the description and the figures.

According to a first aspect, a skiplist management system comprises: processors arranged for parallel execution of threads; a shared memory storing a skiplist accessible by the executing threads of the processors, the skiplist arranged as an ordered set of nodes, each node including a single key stored in a node-list component used for arranging the respective node in the ordered set, each node-list component including a forward pointer to a next node-list in the ordered set, a subset of nodes including respective towers above the node-list component, the towers having a height of at least one level with forward pointers connecting nodes of the ordered set at respective levels forming a respective index-list at each level. The skiplist management system further comprises at least one transaction execution thread executed by at least one of the plurality of processors that is to: execute a range-query operation to identify at least one node of the ordered set of nodes between a first lower key value and a second upper key value, the key-range operation executed by an execution phase and a commit phase, wherein during the execution phase the at least one transaction execution thread traverses nodes of the skiplist in a lock-free state, wherein during the commit phase the at least one transaction execution thread executes a commit protocol that guarantees transaction consistency of the skiplist structure and validates consistency of the range-query operation.

The systems and/or methods (e.g., implemented by code instructions executed by one or more processors) described herein provide an underlying optimistic transaction model optionally implemented in a multicore environment, without node (e.g., key-range) locking, and consistent transaction execution based on the Skiplist data structure. Verifying range query consistency is provided as a solution to a phantom problem. When a particular key-range is scanned, with nodes that are present during the scan being tracked, membership in the range may change without being detected, thereby violating transaction consistency. The systems and/or methods (e.g., implemented by code instructions executed by one or more processors) described herein provide a technical solution to the technical problem of maintaining the consistency of the Skiplist data structure while concurrent transaction execution threads execute node-insert operations and/or node-delete operations. The consistency of the range-query operation is validated by detecting phantom key insertions and/or deletions. Predecessor nodes associated with the node-insert and key-range operations are used to detect phantom nodes, as described herein.

The systems and/or methods (e.g., implemented by code instructions executed by one or more processors) described herein provide the key-range consistency without node locking by keeping track of the set of nodes that are scanned during the transaction execution phase, and revalidating the scanned set during the commit phase. Traversing in the lock-free state provides for scalability of the in-memory database associated with the Skiplist, by preventing or reducing processor contention. It is noted that in contrast, other methods revalidate a scanned node set using a version number assigned to each node of a tree data structure (where structural modification to a tree node result in a version number change for all affected nodes). The systems and/or methods described herein do not necessarily rely on node version numbers in a similar manner, since processing the versions is computationally expensive to implement within the Skiplist where each node represents a single key.

In one embodiment, each of the plurality of the at least one execution threads concurrently execute during the execution phase one of: a node-insert operation that inserts a new node into the skiplist, a node-delete operation that removes an existing node from the skiplist, and the range-query operation.

In one embodiment, the at least one transaction execution thread is adapted to designate at least one node of the skiplist as a range-guard node for a key-range[A,B] of the range-query operation when a reference to the at least one node is inserted into a scan-set storing nodes visited by the at least one transaction execution thread, wherein the range-guard of key-range[A,B] denotes a node containing key A or containing the largest key K such that K<A, wherein the scan-set denotes nodes traversed while executing the key-range operation.

In one embodiment, the system further comprises aborting the at least one transaction execution thread when the range-guard node in the scan-set is deleted and removed from the skiplist structure by at least one lazy skiplist cleaner thread that reclaims memory space of deleted nodes.

In one embodiment, each respective node of the skiplist stores: a version parameter denoting a version value incremented whenever the forward pointer of the respective node is modified; a state parameter used to help maintain the transaction consistency, the state parameter denoting a state of the respective node selected from the group consisting of: absent, present, and clean; a record-id parameter denoting a database record associated with the respective node; and a write-count parameter denoting a number of concurrent transaction threads executing at least one of a node-insert and a node-delete operation.

Disconnection of nodes with absent values may be batched together, improving computational efficiency of the disconnection process.

In one embodiment, an initial value of the state parameter of the respective node is denoted as free when the respective node is not present in the skiplist, wherein an absent value of the state parameter is indicative of the respective node having an invalid record-id, wherein a present value of the state parameter is indicative of the respective node having a valid record-id, wherein the respective node remains in the skiplist when the respective node includes the absent values of the state parameter, wherein the respective node is moved from the skiplist to a clean-list designated for deletion when the respective node includes the clean value of the state parameter.

In one embodiment, the at least one execution thread is to perform a node-insert operation of a new node into the skiplist by executing: an execution phase that atomically inserts the new node into the node-list component of the skiplist; and a commit phase that links higher levels of the tower of the new node to respective levels of the skiplist when transaction consistency is validated by ensuring that only one transaction execution thread commits the new node into the skiplist and other transaction execution threads fail.

The cost of the validation is linear with the number of nodes in the key-range.

In one embodiment, when a plurality of the at least one execution thread attempt to perform a node-delete operation of an existing node from the skiplist, only one of the plurality of the at least one transaction thread commits the key deletion and the other of the plurality of the at least one transaction thread fail.

In one embodiment, the node-delete operation sets the state parameter of the existing node to absent without physically deleting the node from the skiplist, and further comprising at least one skiplist cleaner thread that lazily physically deletes the node from the skiplist.

In one embodiment, the commit phase is executed by: locking each node in a write-set in a global order; resolving node-insert and node-delete conflicts and detecting inconsistent range-query operations according to a state parameter of respective nodes such that only one of a plurality of concurrently executed transaction threads is allowed to commit.

In one embodiment, the commit phase is further executed by: protecting range-query operations from phantom node-insert operations by verifying that a version of nodes in the scan-set remains unchanged and the range-guard node has not been cleaned.

In one embodiment, the commit phase is further executed by: committing node-insert operations by changing the state parameter and record-id of the new node and unlocking the write-set; and connecting higher levels of the towers of each node in the write-set to respective levels of the skiplist.

In one embodiment, the system further comprises a lazy node link manager thread that traverses nodes at sequential levels of towers of the skiplist from a highest level to the node-list level, and executes: a lazy node connection thread that traverses nodes of the skiplist at the respective level, connects the node-list components of nodes designated with a state parameter value of present, and connects the tower of the respective node to respective levels, and a lazy node link disconnection threads that traverses nodes of the skiplist at the respective level, disconnects towers of nodes having a node-list component designated with the state parameter value of absent, and deletes the node-list component from the skiplist using a lazy node cleaner thread that reclaims memory space of deleted nodes.

The splitting reduces latency of the node-insert and node-delete operations.

According to a second aspect, a method for managing a skiplist, is provided. The skiplist is arranged as an ordered set of nodes, each node including a single key stored in a node-list component used for arranging the respective node in the ordered set, the node-list component including a forward pointer to a next node-list in the ordered set, a subset of nodes including respective towers above the node-list component, the towers having a height of at least one level with forward pointers connecting nodes of the ordered set at respective levels forming a respective index-list at each level. The method comprises the operations of: executing a range-query operation to identify at least one node of the ordered set of nodes between a first lower key value and a second upper key value, the range-query operation being executed by a transaction execution thread during an execution phase and a commit phase, wherein during the execution phase the at least one transaction execution thread traverses nodes of the skiplist in a lock-free state, wherein during the commit phase the at least one transaction execution thread executes a commit protocol that guarantees transaction consistency of the skiplist structure and validates consistency of the range-query operation.

In one embodiment, the method for managing a skiplist can operate on a system according to any of the previous embodiments the system.

According to a third aspect, a computer program stored on a computer readable medium runs the preceding method according to the second aspect when executed by a processor of a computer.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 is an exemplary dataflow diagram depicting transitions between values of the state parameter of node(s), in accordance with some embodiments of the present invention;

FIG. 5 is a flowchart of an exemplary method for implementing the node-delete operation, in accordance with some embodiments of the present invention;

FIG. 6 includes pseudocode of an exemplary implementation of the commit phase, in accordance with some embodiments of the present invention.

DETAILED DESCRIPTION

Figure 1:
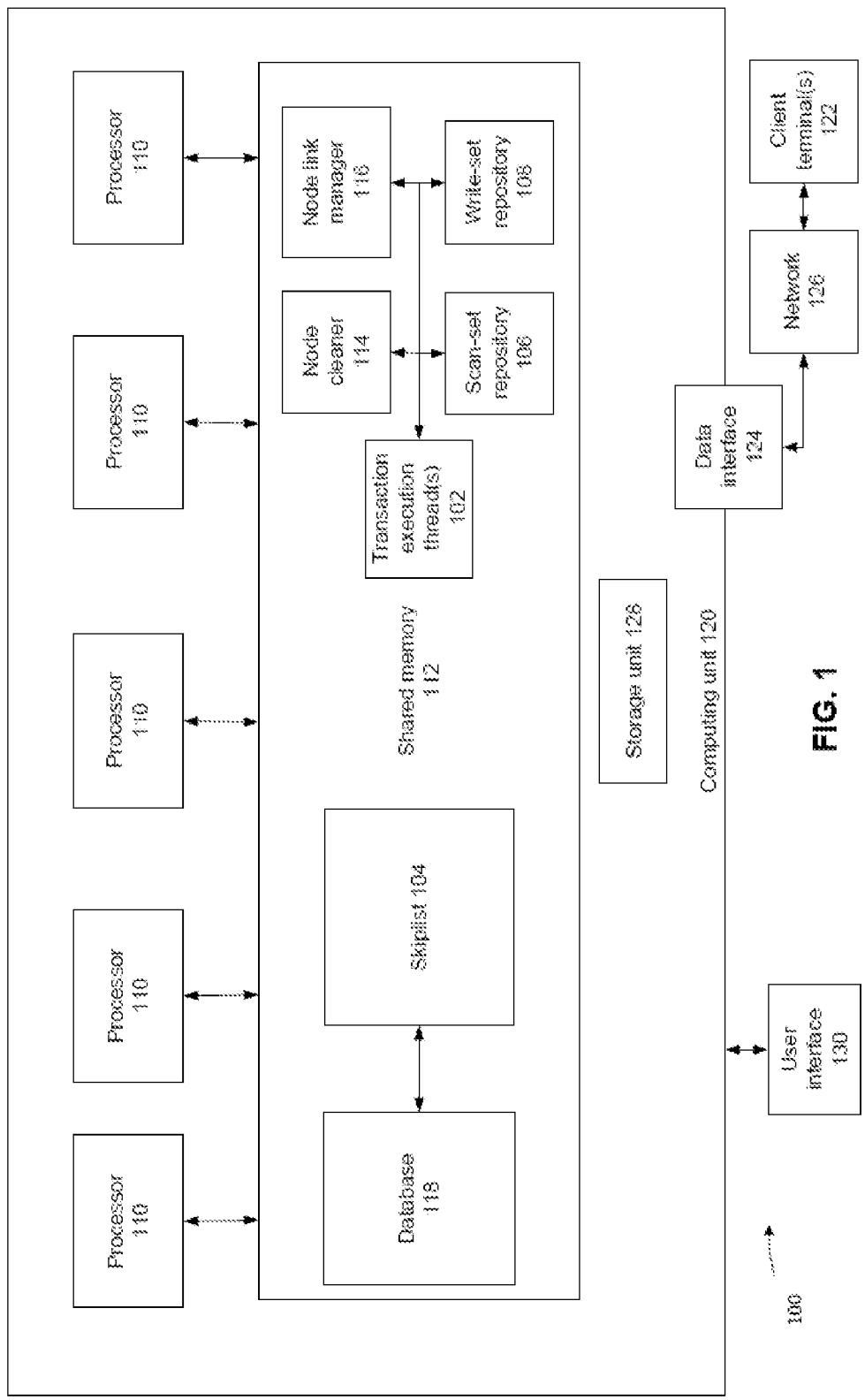
FIG. 1 is a block diagram of components of a system that includes a transaction execution thread(s) that performs a range-query, node-insert, and/or node-delete operation(s) on a Skiplist, in accordance with some embodiments of the present invention.

Embodiments of the present invention relate to systems and methods for managing a Skiplist and, more specifically to systems and methods or performing a range query on a Skiplist data structure.

In various embodiments of the present invention, systems and/or methods (e.g., implemented by code instructions executed by one or more processors) include at least one transaction execution thread (optionally executed by processors arranged for parallel execution of threads) that executes a range-query operation on a Skiplist stored in a shared memory accessible by the parallel processors. The range-query is executed based on an execution phase and a commit phase. During the execution phase, the transaction execution thread(s) traverses nodes of the Skiplist in a lock-free state. Traversing in the lock-free state provides for scalability of the in-memory database associated with the Skiplist, by preventing or reducing processor contention. During the commit phase, the transaction execution thread(s) execute a commit protocol that provides transaction consistency of the Skiplist and validates consistency of the range-query operation.

The systems and/or methods (e.g., implemented by code instructions executed by one or more processors) described herein provide an underlying optimistic transaction model optionally implemented in a multicore environment, without node (e.g., key-range) locking, and consistent transaction execution based on the Skiplist data structure. Verifying range query consistency is provided as a solution to a phantom problem. When a particular key-range is scanned, with nodes that are present during the scan being tracked, membership in the range may change without being detected, thereby violating transaction consistency. The systems and/or methods (e.g., implemented by code instructions executed by one or more processors) described herein provide a technical solution to the technical problem of maintaining the consistency of the Skiplist data structure while concurrent transaction execution threads execute node-insert operations and/or node-delete operations. The consistency of the range-query operation is validated by detecting phantom key insertions and/or deletions. Predecessor nodes associated with the node-insert and key-range operations are used to detect phantom nodes, as described herein.

The systems and/or methods (e.g., implemented by code instructions executed by one or more processors) described herein provide the key-range consistency without node locking by keeping track of the set of nodes that are scanned during the transaction execution phase, and revalidating the scanned set during the commit phase. It is noted that in contrast, other methods revalidate a scanned node set using a version number assigned to each node of a tree data structure (where structural modification to a tree node result in a version number change for all affected nodes). The systems and/or methods described herein do not necessarily rely on node version numbers in a similar manner, since processing the versions is computationally expensive to implement within the Skiplist where each node represents a single key.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Various embodiments of the present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of various embodiments of systems, methods, and computer program products according to various embodiments of the present invention. In this regard, each block in the flowchart or block diagrams may represent a module, segment, or portion of instructions, which comprises one or more executable instructions for implementing the specified logical function(s) or operations. In alternative embodiments, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or operations or carry out combinations of special purpose hardware and computer instructions.

As used herein, the term node A (where A is a value, for example, an integer, a real number) refers to the node associated with key A.

Figure 2:
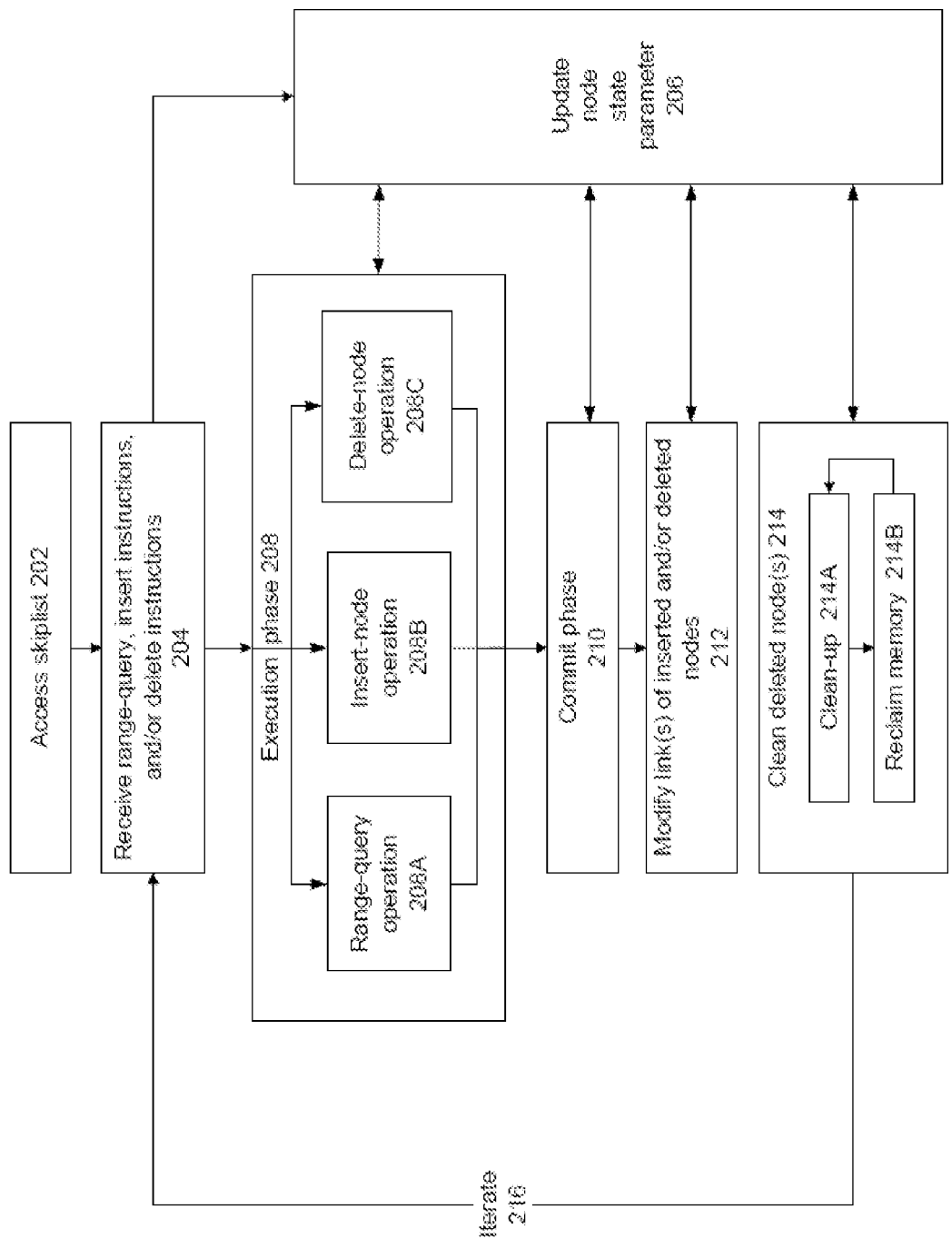
FIG. 2 is a flowchart of a method of implementing consistent range-query operations on the Skiplist by the transaction execution thread(s), in accordance with some embodiments of the present invention.

Reference is now made to FIG. 1, which is a block diagram of components of a system 100 that includes a transaction execution thread(s) 102 performs a range-query, node-insert, and/or node-delete operation(s) on a Skiplist 104, in accordance with some embodiments of the present invention. Transaction execution thread(s) 102 execute consistent range-query operations on Skiplist 104 in a multicore environment. Reference is also made to FIG. 2, which is a flowchart of a method of implementing consistent range-query operations on the Skiplist by the transaction execution thread(s), in accordance with some embodiments of the present invention.

System 100 includes multiple processors 110 designed for parallel execution of threads. Processors 110 may be arranged, for example, as one or more multicore processors, and/or a set of processors and/or computational nodes arranged for parallel processors. Processors 110 may be implemented as homogenous processors and/or heterogeneous processors. Processors 110 may be independent processors 110. Each processor 110 is implemented as, for example, as a central processing unit(s) (CPU), a graphics processing unit(s) (GPU), field programmable gate array(s) (FPGA), digital signal processor(s) (DSP), and application specific integrated circuit(s) (ASIC).

Processors 110 access a shared memory 112 that stores Skiplist 104 and may store transaction execution thread(s) 102. Shared memory 112 may store one or more of: scan-set repository 106 that stores the nodes visited by transaction execution thread(s) during processing of a range-query operation (optionally augmented by the predecessor of each key-range), a write-set repository 108 that stores the set of nodes involved with node-insert and node-delete operations including the node state parameter and operation-type parameter (i.e., node-insert or node-delete) executed on each node, a node cleaner 114 (e.g., code instructions) that recovers memory used by deleted nodes, and a node link manager 116 (e.g., code instructions) that processes inserted and/or deleted nodes, as described herein.

Transaction execution thread(s) 102 may be stored in shared memory 112, and/or another memory device, and/or implemented as code executed by processor(s) 110 and/or code executed by another processor(s), and/or in hardware. Instruction for transaction execution thread(s) 102 may be stored, for example, in shared memory 112, in a main memory, on a storage device, and/or in other devices.

Shared memory 112 may be implemented as a main memory of computing unit 120, and/or another fast access memory device. Shared memory 112 may store code instructions executed by respective processor(s) 110. Shared memory 112 may be implemented, for example, as a random access memory (RAM), read-only memory (ROM), and/or a storage device, for example, non-volatile memory, magnetic media, semiconductor memory devices, hard drive, removable storage, and optical media (e.g., DVD, CD-ROM).

Transaction execution thread(s) 102 may be implemented within a computing unit 120, for example, a network server, a web server, a computing cloud, a local server, a remote server, a client terminal running code, mobile device, stationary device, server, smartphone, laptop, tablet computer, wearable computing device, glasses computing device, watch computing device, desktop computer, and a kiosk. Computing unit 120 may be implemented as a single computing device, a network of computing devices, a distributed system of interconnected nodes, or other architectures.

Computing unit 120 may be implemented as a hardware component (e.g., standalone computing unit), as a software component (e.g., implemented within an existing computing unit), and/or as a hardware component inserted into an existing computing unit (e.g., plug-in card, attachable unit). The server implementation may provide services to client terminal(s) 122, for example, by providing software as a service (SAAS), providing an application that may be installed on the respective client terminal 122 that communicates with server implementation of computing unit 120, and/or providing functions using remote access sessions (e.g., accessing computing unit 120 using a web browser installed on client terminal 122).

Computing unit 120 may include a data interface 124 for communicating with external devices, for example, with client terminal(s) 122, external storage units, and/or remote servers. Data interface 124 may include, for example, one or more of: a network interface (e.g., hardware and/or virtual), a cable interface, and/or a wireless interface. Client terminals 122 may access computing unit 120 over a network 126, for example, the internet, a wireless network, a cellular network, a private network, a virtual private network, and a local area network.

Computing unit 120 may include a storage unit 128 that act as a data repository for storing data, for example, a memory, a hard-drive, an optical disc, a temporary storage unit, an internal storage unit, and an external (optionally removable) storage unit.

Computing unit 120 may be associated with one or more user interfaces 130. Exemplary user interfaces 130 (which may be integrated with a display, or be implemented as a separate device) include one or more of: a touchscreen, a keyboard, a mouse, or voice activated software operating using speakers and microphone.

One or more operations described with reference to FIG. 2 may be implemented, for example, by transaction execution thread(s) 102, executed by one or more processors 110 (and/or other processor(s)) of computing unit 120 executing code instructions stored in memory 112 (and/or in another memory device).

In operation 202, Skiplist 104 is accessed. Skiplist 104 may be associated with a database 118. For example, Skiplist 104 can store an index associated with database 118. In one embodiment, database 118 is an in-memory database stored in shared memory 112 and/or another fast access memory, and may be concurrently accessed by one or more of processors 110. In one embodiment, database 118 uses optimistic concurrency control mechanisms, for example, SILO. It is noted that as used herein, the term in-memory means a database for which the entire database is located within a fast access time memory.

Skiplist 104 may include identifiers that map to one or more entries in database 118. For example, keywords and/or numerical values (e.g., integers, real numbers) that map to documents and/or database entries that include the keywords and/or are sorted according to the numerical values. The database may be queried by client terminal 122 accessing computing unit 120. Database 118 may store data instances. Each data instance may include one or more data entries. The data instances may include text based documents, for example, documents, emails, word processing documents, presentations, spreadsheets, application determined database entries, records, medical records, and portable document format (PDF) files. Data instances may include files, for example, images, music files, other audio files, videos, application defined files, and other data. Examples of data entries may be words, paragraphs, metadata, pages, and related files. For example, a user may use user interface 130 (and/or client terminal 122) to access computing unit 120 to enter a range search query for searching over database 118 using Skiplist 104, and/or to perform other functions on database 118 using Skiplist 104 such as adding additional rows, adding additional columns, removing rows, removing columns, adding a new data instance, removing an existing data instance, and/or performing other queries and/or operations on the data.

Skiplist 104 is arranged as an ordered set of nodes. Each node includes a single key stored in a node-list component used for arranging the respective node in the ordered set. Each node-list component includes a forward pointer to the next node-list in the ordered set. A subset of nodes includes respective towers above the node-list component. The towers have a variable height (which may be defined according to the definition of the Skiplist, for example, randomly). Each level of the towers includes forward pointers connecting nodes of the ordered set at respective levels of the tower, forming a respective index-list at each level.

Each node of the Skiplist may store one or more of the following exemplary basic parameters:
  Key—Denotes the key value associated with the node.
  Top-level—A value (e.g., 8 bit integer) denoting the highest node level in the Skiplist structure.
  Lock—Denotes a lock that facilities synchronized access to the node.
  Next—Denotes an array of forward node links.

Each node of the Skiplist may store one or more of the following exemplary payload parameters:
  Version—Denotes a value incremented whenever the forward pointer of the respective node is modified. The number of the version parameter facilitates detection of phantom nodes in the Skiplist structure due to node-insert operations and/or node-delete operations. The version value may be initially set to zero, and incremented when the node's next link array is modified.
  State—Used to help maintain the transaction consistency when executing the key-range, node-insert, and/or node-delete operations. The state parameter denotes a state of the respective node selected from: absent, present, and clean (as described herein).
  Record-id—Denotes a database record associated with the respective node. The value of record-id is based on the implementation of the database and/or the mapping between nodes of the Skiplist and records of the database. For example, record-id may be implemented as a pointer to one or more records of the database.
  Write-count—Denotes the number of concurrent transaction execution threads executing the node-insert and/or node-delete operations. A non-zero count indicates that the node is associated with an active node-insert and/or node-delete operation.
  Connect-level—A value (e.g., 8 bit integer) denoting the highest node level to which the node is connected. The connect-level parameter may be updated by the lazy node cleaner when disconnecting nodes from the Skiplist (as described herein).

In one embodiment, one or more predecessor nodes are defined. The predecessor node(s) is associated with the range-query to detect phantom nodes. The predecessor node may be denoted as predecessor(A), where the predecessor for key A is a node that stores the largest key K such that K<A. The structure of the Skiplist guarantees that if node A exists, then node A is connected to node K at level 0.

In operation 204, the computing unit receives instructions to perform one or more of: insertion of new data into the database, deletion of existing data from the database, and/or a range-query to search for data stored in the database. The instructions may be received, for example, from a client terminal and/or a user interface, for example, based on data entered by a user using the database.

The higher level instructions for operations on the database may be translated (e.g., by database management code) into lower level instructions for operations on the Skiplist (or the lower level instructions are received). The lower level instructions include one or more of: node-insert operation that inserts a new node into the Skiplist, node-delete operation that removes an existing node from the Skiplist, and range-query operation that identifies one or more nodes of the Skiplist between a lower key value and an upper key value.

The lower level instructions are implemented by the transaction execution thread(s), optionally in parallel by the multicore processor, and/or parallel processors.

In operation 206, the value of the state parameter of each node of the Skiplist is tracked and/or updated. The value of the state parameter of each node of the Skiplist may be tracked by a state diagram, which may be stored in memory 112, or another storage device. The state of the node(s) of the Skiplist may be stored within the node itself as the state parameter described herein.

The value of the state parameter may be updated during processing by operations 208-214, as described herein. The current value of the state parameter may be accessed during operations 208-214, as described herein.

The Skiplist may be implemented as a map(k→v), where an existing key mapping is denoted using the value absent assigned to the state parameter when k maps to invalid value(s) of v, and denoted as present (assigned to the state parameter) when k maps to a valid value(s) of v.

Reference is now made to FIG. 3, which is an exemplary dataflow diagram depicting transitions between values of the state parameter of node(s), in accordance with some embodiments of the present invention. Valid transitions between values of the state parameter of the node occur due to the following operations: node-insert, node-delete, commit, abort, and clean. The values stored in the state parameter of the node represent the state of the node.

Transitions between values of the state parameter of each node occur during execution of node-insert operation, and node-delete operations, for the respective node, as described herein.

The state parameter of each node may be implemented, for example, using two bits. One bit represents the absent value of the state parameter. When the bit is set, the value of the state parameter denotes absent. When the bit is not set, the value of the state parameter denotes present. Another bit represents the clean value of the state parameter. The value of the state parameter denotes clean if and only if the bit is set.

In operation 302, an initial value of the state parameter of the respective node is assigned the value free. The free value denotes that the node is not present in the Skiplist. The node may be associated with a free memory pool (e.g., stored in shared memory 112 and/or another storage device).

The initial value of the state parameter of the header node of the Skiplist (i.e. the first node, also termed the sentinel node) is set to present with a zero value for the version parameter.

In operation 304, the absent value of the state parameter is indicative of the node having an invalid record-id.

The absent value is assigned to the state parameter of the node when the commit phase of the node-delete operation is executed, and/or when a node-insert operation is executed.

A node having an absent value resulting from committing the node-delete operation remains in the Skiplist. The node remains in the Skiplist in order to not break the Skiplist structure. The node is removed by the node cleaner (as described herein) to reclaim the space of the node.

In operation 306, the present value of the state parameter is indicative of the node having a valid value for the record-id.

In operation 308, the node is moved from the Skiplist to a clean-list designated for deletion when the node includes the clean value of the state parameter.

The node cleaner moves nodes having absent values of the state parameter to a clean-list (e.g., stored in the shared memory and/or another storage device) when the nodes are not associated with active node-insert operations (i.e., have a value of zero for the write-count parameter). Nodes moved to the clean-list are assigned the value of clean for the state parameter prior to the move. Nodes in the clean-list are no longer visible to new transaction execution threads. The cleaning process reclaims the memory space of the nodes in the clean-list when the nodes are not visible to active transaction execution threads, and are no longer associated with active range-query operations. Additional details of the node cleaner are described herein, for example, with reference to operation 214.

Referring now back to FIG. 2, in operation 208, the execution phase is implemented. Execution threads may concurrently execute, and/or execute in an arbitrary order, one or more of: the range-query operation (as described with reference to operation 208A), a node-insert operation that inserts a new node into the Skiplist (as described with reference to operation 208B), and a node-delete operation that removes an existing node from the Skiplist (as described with reference to operation 208C).

The transaction execution thread(s) traverses the nodes of the Skiplist in a lock-free state. It is noted that certain transaction execution thread(s) may be forced to wait until other transaction execution thread(s) release their locks.

Information is collected about the traversed nodes.

In operation 208A, a range-query operation is executed by transaction execution thread(s) to identify node(s) of the Skiplist. The identified nodes include key values between a lower key value and an upper key value defined by the range-query operation.

Nodes visited by the transaction execution thread(s) are stored in the scan-set repository. The scan-set is used to validate the consistency of the range-query scan at the commit phase.

The transaction execution thread(s) designates one or more nodes of the Skiplist as range-guard node(s) for key-range[A,B] of the range-query operation. A reference to the node is inserted into the scan-set storing nodes visited by the transaction execution thread.

A scan-set for key-range[A,B] is denoted as the nodes traversed by the transaction execution thread(s) during the scan of nodes with key K, such that A<=K<=B, regardless of the value of the state parameter of the nodes. The scan-set for key-range[A,B] is optionally augmented by predecessor (A) when key A does not exist in the Skiplist. The range-guard for key[A,B] is the node containing A (when exists), or predecessor(A). Nodes added to the scan-set are associated with the node's version, state, and range-guard parameters.

It is noted that nodes are added to the scan-set regardless of the value of their state parameter. The range-query operation ignores invalid record_id values associated with nodes having absent values of the state parameter.

During the commit phase (e.g., as described with reference to operation 210), the transaction execution thread inspects each node in the scan-set and validates the node, as described herein. The cost of the validation is linear with the number of nodes in the key-range.

The scan performed by the transaction execution thread(s) may be implemented at the lowest level (i.e., level 0) of the Skiplist, which stores the consecutive ordered sequence of key values. For range-query operation on [A,B], each scanned node is marked, whether or not the node denotes the range-guard when the node is inserted into the scan-set.

In operation 208B, the execution thread(s) performs a node-insert operation of a new node into the Skiplist. During the execution phase, the new node is atomically inserted into the node-list component of the Skiplist.

Phantom nodes may result from node-insert operations of new keys that cause structural changes to the structure of the Skiplist. It is noted that node-delete operations affect existing nodes, and do not result in structural changes of the Skiplist. Referring back to FIG. 3, the state diagram of the values of the state parameter of nodes indicates that a committed node-delete operation sets the values of the state parameter of the node to absent without actually deleting the node from the Skiplist structure. The actual physical deletion of the node (and reclaiming of the memory space), and addition to the free list, may be done lazily by the node cleaner.

The node-insert operation of a non-existing key K includes incrementing the number of the version parameter of the predecessor node for K. In one embodiment, an optimistic approach is implemented to incrementing the values of the version parameter of the node. When a new node is inserted into the Skiplist structure, the value of the version parameter of the predecessor node is incremented. The increment is executed as part of the node-insert operation, on the assumption that the executing transaction will eventually commit.

It is noted that each node in the scan-set for a given range-query is associated with state, version, and a range-guard parameter at the time the node is added to the scan-set. An example is now described using a Skiplist storing keys (A, D, E), with node N storing key A. The following three transaction execution threads (denoted $T_1$, $T_2$, $T_3$) concurrently execute on the Skiplist: $T_1$ executes the range-query operation for [B,E]; $T_2$ executes the node-insert operation for B; and $T_3$ executes the node-insert operation for C. The scan-set of transaction $T_1$ include nodes N as the predecessor of key-range[B,E]. N is marked as the range-guard when inserted into the scan-set. Regardless of the order of the node-insert(B) and node-insert(C) operations, the end result is that the value of the version parameter of node N is incremented, as N is predecessor for B and/or C. Transaction $T_1$ detects the phantom node-insert operation by observing a change in the value of the version parameter of node N, and aborts.

The node-insert operation on key K may be implemented as follows: When K maps to node(s) with a present value of the state parameter, the node-insert operation fails and the transaction is aborted.

When K does not map to node(s), a new node is allocated from the free space pool (e.g., of memory 112) and the value of the state parameter of the new node is set to the value absent. The parameters version, record-id and connect-level of the newly allocated node are set to zero and the value of the write-count parameter is set to 1. The new node is inserted into the Skiplist structure and added to the transaction's write-set. The insert-if-non-existing primitive ensures that there is never more than one node for a given key in the Skiplist structure. The node with the absent value is inserted into level 0 (i.e., the bottom level) of the Skiplist structure, which triggers incrementing the values of the version parameter of the predecessor node for K. Insertion into higher levels of the towers is done at transaction commit time (i.e., operation 210).

When K already maps to a node having the value absent, the transaction execution thread increments the node's write-count parameter, and the node is added to the transaction execution thread's write-set.

It is noted that multiple transaction execution threads may concurrently attempt to insert the same key into the Skiplist. The commit protocol (e.g., as described herein with reference to operation 210) ensures that only one transaction execution thread commits the inserted key, and that the other transaction execution threads fail.

When the transaction execution thread executes the commit phase, the value of the state parameter of the inserted node is modified to the value present and the record-id parameter is assigned a valid value. The tower of the node is linked to the higher levels of the Skiplist based on the inserted key value. The insert-if-non-existing primitive ensures that the transaction does fail when the node already exists at some level.

It is noted that the commit protocol ensures that the transaction execution thread supersedes the record-id set by the committing transaction. Upon transaction commit/abort, the node's write-count parameter is decremented.

In operation 208C, one or more transaction execution thread(s) perform the node-deletion operation to delete an existing node from the Skiplist.

The transaction execution thread(s) sets the value of the state parameter of the existing node to absent without physically deleting the node from the Skiplist. The node cleaner lazily physically deletes the node from the Skiplist, optionally by executing cleaning thread(s).

The node-delete operation on key K may be implemented as follows. When K does not map to node(s) of the Skiplist, or maps to a node with the value absent of the state parameter of the node, the node-delete operation fails and the transaction execution threads is aborted. Otherwise, the transaction execution thread increments the value of the node's write-count parameter and adds the node to the write-set associated with the transaction execution thread.

It is noted that multiple transactions execution threads may attempt to concurrently delete the same key. The commit protocol (e.g., as described with reference to operation 210) ensures that only one transaction execution thread commits the key deletion, and the other transaction execution threads fail.

When the transaction execution thread executes the commit phase, (e.g., as described with reference to operation 210) the value of the state parameter of the deleted node is modified to absent and the value of the record id is set to NULL. Upon transaction commit/abort, the node's write-count parameter is decremented.

In operation 210, the commit phase is executed. During the commit phase, the transaction execution thread(s) execute a commit protocol that provides transaction consistency of the Skiplist structure, and validates consistency of the range-query operation. The commit protocol ensures that concurrently executing node-insert and node-delete operations for the same key have a single winner.

It is noted that a single transaction execution thread may executing multiple node-insert, node-delete, and range-query operations.

The commit phase links higher levels of the tower of the new node to respective levels of the Skiplist when transaction consistency is validated by ensuring that only one transaction execution thread commits the new node into the Skiplist and other transaction execution threads fail.

The commit phase may be implemented based on four phases.

In phase 1, each node is locked in the write-set. The locking is performed in a global order to avoid deadlocks. An exemplary global order is defined based on increasing node memory address.

In phase 2, the transaction execution thread(s) resolve node-insert and node-delete conflicts, and/or detects inconsistent range-query operations according to the state parameter of the nodes. Only one of multiple concurrently executing transaction threads is allowed to commit. The conflict resolution and/or inconsistent operation detection is performed since no locks are held during the execution phase, which provides for multiple insert-node operations on the same key, and/or multiple delete-node operations on the same key concurrently executed by different transaction execution threads.

The transaction execution thread(s) executing the range-query operation ignores in-progress operations and takes into account only valid record-id values. The commit protocol ensures that the in-progress node-insert and/or node-delete operations of concurrent transactions have not committed during the transaction execution phase.

In phase 3, the transaction execution thread(s) protect range-query operations from phantom node-insert operations. The protection is performed by verifying that the value of the version parameter of nodes in the scan-set remains unchanged and that the range-guard node has not been cleaned. The unchanged version parameter value indicates that no structural changes were made to the skiplist during the range-query processing. Node(s) marked as range-guard(s) protect a certain key-range from phantom node-insert operations. When the node is removed from the Skiplist and added to the clean-list (e.g., by the node cleaner process), range-query consistency is jeopardized and the transaction execution thread(s) is aborted.

In phase 4, node-insert operations and/or abort operations are committed by changing the value of the state parameter and record-id of the new node. The transaction execution phase may unlock the write-set.

It is noted that when during the transaction commit phase, a node marked as range-guard is detected as having been cleaned by the Node Cleaner processor, detection of phantom nodes is jeopardized and the transaction aborts.

In operation 212, the links of newly inserted and/or newly deleted nodes are processed, optionally in a lazy manner, optionally in the background, by node link manager 116.

Node link manager 116 is implemented based on the execution of the node-insert operation and the node-delete operation that may be split into stages. The node-insert operation may be split into a first insert state where the node is inserted into level 0 of the Skiplist and marked as present in the state parameter. The second stage connects the links of the tower of the newly inserted nodes up to level L, where connect-level<L<top-level. The node-delete operation may be split into a first logical deletion stage where the node is logically marked by changing the value of the state parameter to absent. The second stage disconnects the links of the tower of the node at all levels, optionally starting from the top-level down to level 0. A third state physically removes the deleted node from the Skiplist structure.

The splitting reduces latency of the node-insert and node-delete operations.

Higher levels of the towers of each node in the write-set are connected to respective levels of the Skiplist, optionally performed in the background for example, by a node link manager process 116 (e.g., code instructions stored in memory 112) that traverses level 0 (i.e., the lowest level) of the Skiplist and connects missing links of newly inserted nodes having the present value for the state parameter.

Node link manager 112 (e.g. implemented as thread(s)) may traverse nodes at sequential levels of towers of the Skiplist from highest level to the node-list level (i.e., the lowest level 0).

Node link manager 112 may execute a node connector process, optionally, lazy node connection thread(s), that traverses nodes of the Skiplist at the respective level, connects the node-list components of nodes designated with the state parameter value of present, and connects the tower of the respective node to respective levels.

Each node n at level 0 of the Skiplist may be checked to determine whether the respective node has a present value of the state parameter and a zero write-count. The links of such nodes are sequentially connected starting from the low-level=n.current-level+1 up to high-level=n.top-level−1. The order of link connection from low-level to high level ensures correctness. When the links are connected, the node's connect-level parameter is set to the values of the highest level. The zero values for the write-count parameter helps ensure that the current node is not referenced by an active transaction, which may change the value of the state parameter.

Node link manager 112 may execute a node link disconnection process, optionally lazy node link disconnection thread(s) that traverses nodes of the Skiplist at the respective level, disconnects towers of nodes having state parameter value of absent, and deletes the remaining node-list component from the Skiplist, optionally using a lazy node cleaner thread (which may be executed by node cleaner 114) that reclaims memory space of deleted nodes. The disconnection is performed sequentially, from the highest level down to level 1. The sequential disconnection helps ensure correctness. Disconnection of nodes with absent values may be batched together, improving computational efficiency of the disconnection process.

When the value of the state parameter of a node becomes absent, the memory of the node is not immediately reclaimed. Concurrently executing transaction execution thread(s) may be accessing the node. The node is disconnected by first disconnecting the tower (i.e., at levels higher than level 0), and then disconnecting the lowest level.

When processing the linked list for level L, the state of each node in the list is inspected. When the node has absent value for the state parameter, and zero value for the write-count parameter, the node is disconnected from the list and the value of the connect-level parameter is decremented. The zero values for the write-count parameter helps ensure that the node is not referenced by an active transaction, which may change the value of the state parameter of the node.

It is noted that a node that has been disconnected at level L may subsequently change the value of the state parameter to present by a committed node-insert operation, thereby keeping the node links levels smaller than L. Invocation of the Node Connection process amends the missing node links.

In operation 214, the memory space occupied by logically deleted nodes is reclaimed, optionally by node cleaner 114. Nodes with absent values assigned to the state parameter are logically deleted and their memory space may be reclaimed. However, the node with absent value cannot immediately be reclaimed since concurrent transaction execution threads might be accessing the node.

In one embodiment, the transaction execution thread(s) abort when the range-guard node in the scan-set is deleted and removed from the Skiplist structure by the node cleaner.

Node cleaner 114 disconnects nodes with the value absent (assigned to the state parameter) from all skiplist levels greater than 0, and then at level 0 changes the value of the state parameter from absent to clean. The node(s) is moved to a clean-list where the memory of the node is reclaimed.

In one embodiment, node cleaner 114 is a lazy node cleaner, optionally operating based on an epoch mechanism. Node cleaner may be scheduled, for example, according to time (e.g., every certain amount of time), according to a threshold of nodes having absent values (e.g., percentage), or other events.

The node cleaner may be associated with a global cleaner-epoch-number parameter (which may be stored in shared memory 112 and/or another storage device) that is incremented each time the node cleaner is executed.

In one embodiment, the node cleaner is designed according to one or more of the following features:

Operating in a non-blocking manner. Node cleaner may operate as a background process that is executed concurrently with the transaction execution threads. Node cleaner does not stall processing by active transaction execution threads.

Node cleaning may be started and stopped arbitrarily, for example, according to available processing resources.

Node cleaner may operate as two or more separate threads executed in parallel. One thread (or set of threads) disconnects nodes with absent values of the state parameter from the Skiplist. Another thread (or set of threads) reclaims the memory space.

The cleaning may be implemented as a cleanup operation 214A and a reclaim operation 214B, which are iterated at every cleaning epoch. It is noted that for clarify, cleanup operation 214A is described first. However, in practice, reclaim stage 214B may be executed before cleanup operation 214A to claim space of nodes cleaned in the previous epoch.

In operation 214A, nodes with the value absent assigned to the state parameter are removed from the lowest level (i.e., level 0) of the Skiplist and added to the clean-list (which may be stored in memory 112 and/or another storage device). The value of the state parameter is changed to clean.

Nodes are analyzed for removal based on having the absent value, and a zero value for the write-count parameter, and a zero value for the connect-level parameter. Is it noted that as described herein, the node link manager (i.e., 116) disconnects the links of nodes with value absent and sets the value of the connect-level parameter to zero.

Removal of a node with value absent is associated with changing the value of the state parameter to clean while holding a lock on the node and the predecessor. When a node with the value of clean is disconnected from the Skiplist and added to the clean-list, the node is associated with the current value of the cleaner-epoch-number parameter.

In operation 214B, memory space of nodes stored in the clean-list is reclaimed. An exemplary implementation using code instructions that reclaims the memory is based on the global epoch number and uses a global active-transaction array (e.g., stored in shared memory 112 and/or another storage device) that includes an entry for every executing thread. Each of N threads is associated with a respective ID [0 . . . N-1], and threads K is associated with the entry active-transaction[K]. The size of the active-transaction array is a function of the number of cores (and/or processors) executing the threads.

The entry for a certain transaction execution thread stores the context of the operation being executed by the certain transaction execution thread. Each context may include an epoch related variable, which may be denoted as: tx_epoch_number (e.g., 64 bit integer) initially assigned a maximum value (e.g., of the 64 bits). When a transaction execution thread starts, the tx_epoch_number is set to the current value of the global cleaner_epoch_number. When the transaction execution threads ends, the value is set back to the maximum value.

Nodes to be reclaimed cannot be seen by active transaction execution threads. The active-transaction array is inspected, and the value min_tx_epoch_number is computed as the minimal tx_epoch_number of the executing transaction execution threads, according to the relationship:

min_tx_epoch_number=MIN(active-transaction[k]→tx_epoch_number, where 0<=k<=N)

A node with tx_epoch_number<min_tx_epoch_number may be safely deleted from the clean-list and the memory of the node may be reclaimed.

In operation 216, one or more operations 204-214 are iterated. The iterations may occur concurrently by multiple processors executing in parallel.

Figure 4A:
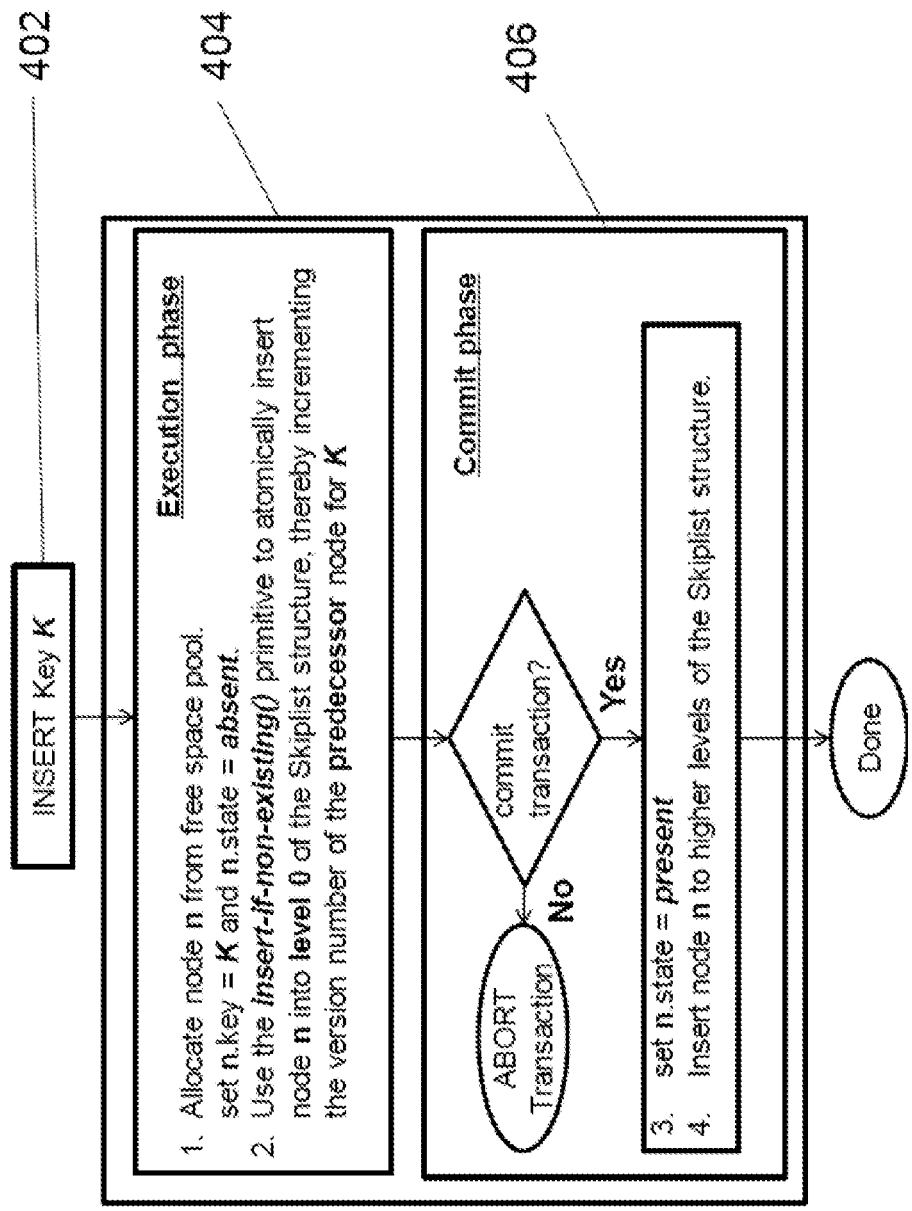
FIG. 4A is a flowchart of an exemplary method for implementing the node-insert operation, in accordance with some embodiments of the present invention.

Reference is now made to FIG. 4A, which is a flowchart of an exemplary method for implementing the node-insert operation, in accordance with some embodiments of the present invention. The method described with reference to operation 208B and/or operation 210 of FIG. 2 may be implemented based on the method described with reference to FIG. 4A.

In operation 402, instructions to insert key K are received.

In operation 404, the execution phase is executed, optionally based on the implementation described with reference to operation 208B of FIG. 2. Node n is allocated from the free space pool. The key parameter of node n is set to K, and the value of the state parameter is set to absent. The insert-if-non-existing( ) primitive is used to atomically insert node n into level 0 of the Skiplist. The value of the version parameter of the predecessor node for K is incremented.

In operation 406, the commit phase is executed, optionally based on the implementation described with reference to operation 210 of FIG. 2. The transaction execution thread aborts when there is no commitment. Otherwise, the value of the state parameter of node n is set to present. Node n is connected to the higher levels of the Skiplist.

Figure 4B:
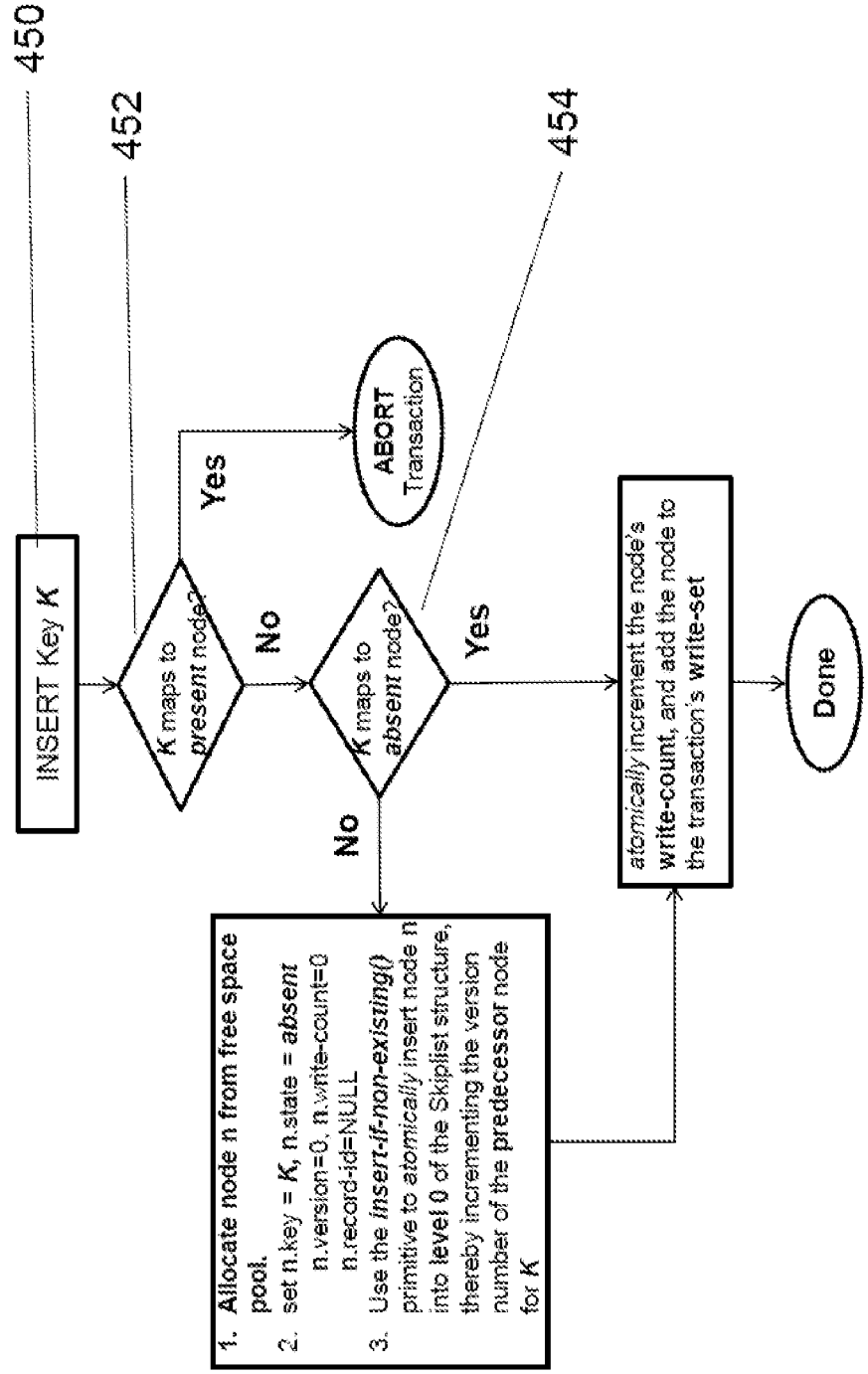
FIG. 4B is a flowchart of another exemplary method for implementing the execution phase of the node-insert operation, in accordance with some embodiments of the present invention.

Reference is now made to. FIG. 4B, which is a flowchart of another exemplary method for implementing the execution phase of the node-insert operation, in accordance with some embodiments of the present invention The method described with reference to operations of FIG. 2 may be implemented based on the method described with reference to FIG. 4B.

In operation 450, instructions to insert key K are received.

In operation 452, the transaction execution thread is aborted when K maps to a node(s) in the skiplist having the value present assigned to the state parameter.

In operation 454, when K maps to a node(s) having the value absent assigned to the state parameter, node n is allocated from the free space pool. The key parameter of node n is set to K, and the value of the state parameter is set to absent. The value of the version parameter is set to 0. The value of the write-count parameter is set to 0. The value of the record-id parameter is set to NULL. The insert-if-non-existing( ) primitive is used to atomically insert node n into level 0 of the Skiplist. The value of the version parameter of the predecessor node for K is incremented.

Alternatively or additionally, the value of the write-count parameter of the node is atomically incremented. The node is added to the write-set of the transaction execution thread(s).

Reference is now made to FIG. 5, which is a flowchart of an exemplary method for implementing the node-delete operation, in accordance with some embodiments of the present invention. The method described with reference to operation 208C and/or operation 210 of FIG. 2 may be implemented based on the method described with reference to FIG. 5.

In operation 502, instructions to delete key K are received.

In operation 504, when K does not map to node(s) in the skiplist and/or maps to node(s) in the skiplist having the value absent for the state parameter, the transaction execution thread(s) abort. Alternatively, the value of the write-count parameter of the node is atomically incremented. The node is added to the write-set of the transaction execution thread(s).

Reference is now made to FIG. 6, which includes pseudo-code of an exemplary implementation of the commit phase (e.g., described with reference to operation 210 of FIG. 2), in accordance with some embodiments of the present invention.

Figure 7:
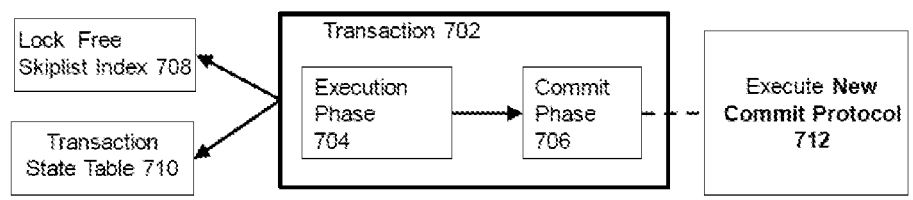
FIG. 7 is a block diagram depicting an exemplary implementation for executing the range-query, node-insert, and/or node-delete operations, in accordance with some embodiments of the present invention.

Reference is now made to FIG. 7, which is a block diagram depicting an exemplary implementation of a model for executing the range-query, node-insert, and/or node-delete operations, in accordance with some embodiments of the present invention.

Transaction 702 (i.e., the range-query, node-insert, and/or node-delete operations) is executed based on an execution phase 704 and a commit phase 706, as described herein. Execution is performed with the Skiplist in a lock-free state 708. The value of the state parameter is updated, as described herein, for example, stored in a transaction state table 710. Commit phase 706 is implemented based on a commit protocol 712, as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant multicore processors and shared memories will be developed and the scope of the terms processor and memory are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A skiplist management system, comprising:
   a plurality of processors arranged for parallel execution of threads;
   a shared memory storing a skiplist accessible by the executing threads of the plurality of processors, the skiplist arranged as an ordered set of nodes, each of the ordered set of nodes including a single key stored in a node-list component used for arranging the respective node in the ordered set, the node-list component including a forward pointer to a next node-list in the ordered set, a subset of nodes including respective towers above the node-list component, the towers having a height of at least one level with forward pointers connecting nodes of the ordered set at respective levels forming a respective index-list at each level; and
   at least one transaction execution thread executed by at least one of the plurality of processors to:
      execute a range-query operation to identify at least one node of the ordered set of nodes between a first lower key value and a second upper key value, the range-query operation being executed by the at least one transaction execution thread during an execution phase and a commit phase, wherein during the execution phase the at least one transaction execution thread traverses nodes of the skiplist in a lock-free state, wherein during the commit phase the at least one transaction execution thread executes a commit protocol that provides transaction consistency of the skiplist and validates consistency of the range-query operation.

2. The system of claim 1, wherein each of the at least one transaction execution thread concurrently executes during the execution phase one of: a node-insert operation that inserts a new node into the skiplist, a node-delete operation that removes an existing node from the skiplist, or the range-query operation.

3. The system of claim 1, wherein the at least one transaction execution thread is to designate at least one node of the skiplist as a range-guard node for a key-range[A,B] of the range-query operation when a reference to the at least one node is inserted into a scan-set storing nodes visited by the at least one transaction execution thread, wherein the range-guard of key-range[A,B] denotes a node containing key A or containing the largest key K such that K<A, wherein the scan-set denotes nodes traversed while executing the key-range operation.

4. The system of claim 3, wherein the at least one transaction execution thread is further to commit an abort operation when the range-guard node in the scan-set is deleted and removed from the skiplist by at least one lazy skiplist cleaner thread that reclaims memory space of deleted nodes.

5. The system of claim 1, wherein each respective node of the skiplist is to store:
a version parameter denoting a version value incremented whenever the forward pointer of the respective node is modified;
a state parameter used to help maintain the transaction consistency, the state parameter denoting a state of the respective node selected from the group consisting of: absent, present, and clean;
a record-id parameter denoting a database record associated with the respective node; and
a write-count parameter denoting a number of concurrent transaction threads executing at least one of a node-insert and a node-delete operation.

6. The system of claim 5, wherein an initial value of the state parameter of the respective node is denoted as free when the respective node is not present in the skiplist, wherein an absent value of the state parameter is indicative of the respective node having an invalid record-id, wherein a present value of the state parameter is indicative of the respective node having a valid record-id, wherein the respective node remains in the skiplist when the respective node includes the absent values of the state parameter, wherein the respective node is moved from the skiplist to a clean-list designated for deletion when the respective node includes the clean value of the state parameter.

7. The system of claim 1, wherein the at least one execution thread is to perform a node-insert operation of a new node into the skiplist by executing:
the execution phase that atomically inserts the new node into the node-list component of the skiplist; and
the commit phase that links higher levels of the tower of the new node to respective levels of the skiplist when transaction consistency is validated by ensuring that only one transaction execution thread commits the new node into the skiplist and other transaction execution threads fail.

8. The system of claim 1, wherein when a plurality of the at least one transaction execution thread attempt to perform a node-delete operation of an existing node from the skiplist, only one of the at least one transaction execution thread commits the key deletion and one or more of the other at least one transaction thread fail.

9. The system of claim 8, wherein the node-delete operation sets a state parameter of the existing node to absent without physically deleting the node from the skiplist, and further comprising at least one skiplist cleaner thread that lazily physically deletes the node from the skiplist.

10. The system of claim 1, wherein the commit phase is executed by:
locking each node in a write-set in a global order;
resolving node-insert and node-delete conflicts and detecting inconsistent range-query operations according to a state parameter of respective nodes such that only one of a plurality of concurrently executed transaction threads is allowed to commit.

11. A method for managing a skiplist, comprising:
executing a range-query operation to identify at least one node from the skiplist between a first lower key value and a second upper key value, wherein the skiplist is arranged as an ordered set of nodes, each of the ordered set of nodes including a single key stored in a node-list component used for arranging the respective node in the ordered set, the node-list component including a forward pointer to a next node-list in the ordered set, a subset of nodes including respective towers above the node-list component, the towers having a height of at least one level with forward pointers connecting nodes of the ordered set at respective levels forming a respective index-list at each level;
wherein the range-query operation is executed by at least one transaction execution thread during an execution phase and a commit phase,
wherein during the execution phase the at least one transaction execution thread traverses nodes of the skiplist in a lock-free state,
wherein during the commit phase the at least one transaction execution thread executes a commit protocol that provides transaction consistency of the skiplist and validates consistency of the range-query operation.

12. The method of claim 11, wherein each of the at least one transaction execution thread concurrently executes during the execution phase one of: a node-insert operation that inserts a new node into the skiplist, a node-delete operation that removes an existing node from the skiplist, or the range-query operation.

13. The method of claim 11, wherein the at least one transaction execution thread is to designate at least one node of the skiplist as a range-guard node for a key-range[A,B] of the range-query operation when a reference to the at least one node is inserted into a scan-set storing nodes visited by the at least one transaction execution thread, wherein the range-guard of key-range[A,B] denotes a node containing key A or containing the largest key K such that K<A, wherein the scan-set denotes nodes traversed while executing the key-range operation.

14. The method of claim 13, wherein the at least one transaction execution thread is further to commit an abort operation when the range-guard node in the scan-set is deleted and removed from the skiplist by at least one lazy skiplist cleaner thread that reclaims memory space of deleted nodes.

15. The system of claim 11, wherein each respective node of the skiplist is to store:

a version parameter denoting a version value incremented whenever the forward pointer of the respective node is modified;

a state parameter used to help maintain the transaction consistency, the state parameter denoting a state of the respective node selected from the group consisting of: absent, present, and clean;

a record-id parameter denoting a database record associated with the respective node; and a write-count parameter denoting a number of concurrent transaction threads executing at least one of a node-insert and a node-delete operation.

16. A computer program stored on a non-transitory computer-readable medium for managing a skiplist, the computer program, when executed by a processor of a computer, causing the processor to perform a method of:

executing a range-query operation to identify at least one node from the skiplist between a first lower key value and a second upper key value, wherein the skiplist is arranged as an ordered set of nodes, each of the ordered set of nodes including a single key stored in a node-list component used for arranging the respective node in the ordered set, the node-list component including a forward pointer to a next node-list in the ordered set, a subset of nodes including respective towers above the node-list component, the towers having a height of at least one level with forward pointers connecting nodes of the ordered set at respective levels forming a respective index-list at each level;

wherein the range-query operation is executed by at least one transaction execution thread during an execution phase and a commit phase, wherein during the execution phase the at least one transaction execution thread traverses nodes of the skiplist in a lock-free state, wherein during the commit phase the at least one transaction execution thread executes a commit protocol that provides transaction consistency of the skiplist and validates consistency of the range-query operation.

17. The computer program of claim 16, wherein each of the at least one transaction execution thread concurrently executes during the execution phase one of: a node-insert operation that inserts a new node into the skiplist, a node-delete operation that removes an existing node from the skiplist, or the range-query operation.

18. The computer program of claim 16, wherein the at least one transaction execution thread is to designate at least one node of the skiplist as a range-guard node for a key-range[A,B] of the range-query operation when a reference to the at least one node is inserted into a scan-set storing nodes visited by the at least one transaction execution thread, wherein the range-guard of key-range[A,B] denotes a node containing key A or containing the largest key K such that K<A, wherein the scan-set denotes nodes traversed while executing the key-range operation.

19. The computer program of claim 18, wherein the at least one transaction execution thread is further to commit an abort operation when the range-guard node in the scan-set is deleted and removed from the skiplist by at least one lazy skiplist cleaner thread that reclaims memory space of deleted nodes.

20. The computer program of claim 16, wherein each respective node of the skiplist is to store:

a version parameter denoting a version value incremented whenever the forward pointer of the respective node is modified;

a state parameter used to help maintain the transaction consistency, the state parameter denoting a state of the respective node selected from the group consisting of: absent, present, and clean;

a record-id parameter denoting a database record associated with the respective node; and a write-count parameter denoting a number of concurrent transaction threads executing at least one of a node-insert and a node-delete operation.

* * * * *